US009828906B2

(12) United States Patent
Thomassin et al.

(10) Patent No.: US 9,828,906 B2
(45) Date of Patent: *Nov. 28, 2017

(54) ROTARY INTERNAL COMBUSTION ENGINE WITH VARIABLE VOLUMETRIC COMPRESSION RATIO

(71) Applicant: PRATT & WHITNEY CANADA CORP., Longueuil (CA)

(72) Inventors: Jean Thomassin, Ste-Julie (CA); Andre Julien, Ste Julie (CA); Edwin Schulz, Greenfield Park (CA); Michael Lanktree, La Prairie (CA)

(73) Assignee: PRATT & WHITNEY CANADA CORP., Longueuil, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,099

(22) Filed: Nov. 29, 2016

(65) Prior Publication Data

US 2017/0074160 A1 Mar. 16, 2017

Related U.S. Application Data

(63) Continuation of application No. 14/152,255, filed on Jan. 10, 2014, now Pat. No. 9,540,992, which is a
(Continued)

(51) Int. Cl.
*F02B 53/00* (2006.01)
*F02B 53/06* (2006.01)
(Continued)

(52) U.S. Cl.
CPC .............. *F02B 53/06* (2013.01); *F01C 1/22* (2013.01); *F01C 20/06* (2013.01); *F01C 20/10* (2013.01);
(Continued)

(58) Field of Classification Search
CPC .. F01C 1/22; F01C 20/10; F01C 20/24; F01C 21/18; F01C 21/106; F01C 21/08; F02B 53/04; F02B 53/06
(Continued)

(56) References Cited

U.S. PATENT DOCUMENTS 3,168,078 A 2/1965 Lamm
3,446,190 A 5/1969 Bensinger et al.
(Continued)

FOREIGN PATENT DOCUMENTS

CN 101636558 1/2010
CN 101892899 11/2010
(Continued)

OTHER PUBLICATIONS

Office Action issued by the Chinese Patent Office dated Sep. 25, 2015.

*Primary Examiner* — Ngoc T Nguyen
(74) *Attorney, Agent, or Firm* — Norton Rose Fulbright Canada

(57) ABSTRACT

A method of controlling an air intake flow in a rotary engine having primary and secondary inlet ports, including positioning the secondary inlet port rearwardly of the primary inlet port and forwardly of the exhaust port along a direction of a revolution of the rotor, and controlling air intake flows communicating between an air source and the primary and secondary inlet ports. During engine start-up, a primary valve is closed to prevent the intake air flow between the primary inlet port and the air source and a secondary valve is opened to allow the intake air flow between the secondary inlet port and the air source. A rotary engine defining different compression ratios through actuation of a valve is also discussed.

17 Claims, 5 Drawing Sheets

Related U.S. Application Data continuation of application No. 13/273,488, filed on Oct. 14, 2011, now Pat. No. 8,656,888.

(60) Provisional application No. 61/512,563, filed on Jul. 28, 2011.

(51) Int. Cl.

| | | |
|---|---|---|
| *F01C 1/22* | (2006.01) | |
| *F01C 20/06* | (2006.01) | |
| *F01C 20/10* | (2006.01) | |
| *F01C 20/24* | (2006.01) | |
| *F01C 21/08* | (2006.01) | |
| *F01C 21/10* | (2006.01) | |
| *F01C 21/18* | (2006.01) | |
| *F02B 53/04* | (2006.01) | |
| *F02B 53/02* | (2006.01) | |
| *F02B 55/16* | (2006.01) | |
| *F01C 11/00* | (2006.01) | |
| *F01C 21/06* | (2006.01) | |
| *F04C 29/00* | (2006.01) | |

(52) U.S. Cl.
CPC .............. *F01C 20/24* (2013.01); *F01C 21/08* (2013.01); *F01C 21/106* (2013.01); *F01C 21/18* (2013.01); *F02B 53/02* (2013.01); *F02B 53/04* (2013.01); *F02B 55/16* (2013.01); *F01C 11/006* (2013.01); *F01C 21/06* (2013.01); *F01C 21/183* (2013.01); *F02B 2053/005* (2013.01); *F04C 29/0092* (2013.01); *F04C 2240/80* (2013.01)

(58) Field of Classification Search
USPC ................ 123/202, 205, 207, 208; 418/61.2
See application file for complete search history.

(56) References Cited

U.S. PATENT DOCUMENTS

| | | |
|---|---|---|
| 3,531,932 A | 10/1970 | Froede |
| 3,647,327 A | 3/1972 | Manthey |
| 3,777,721 A | 12/1973 | Sawada |
| 3,780,707 A | 12/1973 | Cole |
| 3,789,809 A | 2/1974 | Schubert |
| 3,791,145 A | 2/1974 | Yamamoto |
| 3,795,228 A | 3/1974 | Shimizu |
| 3,827,408 A | 8/1974 | Ishikawa |
| 3,844,256 A | 10/1974 | Ishikawa et al. |
| 3,847,514 A | 11/1974 | Chen et al. |
| 3,867,910 A | 2/1975 | Galonska |
| 3,893,429 A | 7/1975 | Jones et al. |
| 3,905,337 A | 9/1975 | Shimoji et al. |
| 3,915,126 A | 10/1975 | Kishimoto et al. |
| 3,930,468 A | 1/1976 | Uchiyama |
| 3,957,021 A | 5/1976 | Loyd, Jr. |
| 3,977,368 A | 8/1976 | Yamaguchi et al. |
| 3,980,054 A | 9/1976 | Kono |
| 3,994,266 A | 11/1976 | Jones |
| 3,995,599 A | 12/1976 | Shier |
| 4,008,693 A | 2/1977 | Rea et al. |
| 4,030,454 A | 6/1977 | Yamamoto et al. |
| 4,036,183 A | 7/1977 | Igashira et al. |
| 4,055,153 A | 10/1977 | Kono |
| 4,055,154 A | 10/1977 | Kono |
| 4,063,535 A | 12/1977 | Elermann |
| 4,067,300 A | 1/1978 | Kono |
| 4,084,549 A | 4/1978 | Satow |
| 4,089,305 A | 5/1978 | Gregg |
| 4,108,123 A | 8/1978 | Ito et al. |
| RE29,759 E | 9/1978 | Yamamoto |
| 4,756,284 A | 7/1988 | Okimoto et al. |
| 4,766,729 A | 8/1988 | Miyajima |
| 5,138,831 A | 8/1992 | Cowan, Sr. |
| 5,704,332 A | 1/1998 | Motakef |
| 5,803,041 A | 9/1998 | Motakef |
| 6,129,067 A | 10/2000 | Riley |
| 6,951,211 B2 | 10/2005 | Bryant |
| 6,978,758 B2 | 12/2005 | Elmer |
| 7,201,134 B2 | 4/2007 | Guest et al. |
| 7,353,796 B2 | 4/2008 | Sharudenko et al. |
| 7,753,036 B2 | 7/2010 | Lents et al. |
| 7,775,044 B2 | 8/2010 | Julien et al. |
| 7,832,372 B2 | 11/2010 | Blank |
| 2004/0123849 A1 | 7/2004 | Bryant |
| 2007/0137609 A1 | 6/2007 | Morse |
| 2007/0137610 A1 | 6/2007 | Hudson |
| 2009/0007882 A1 | 1/2009 | Lents et al. |
| 2012/0227397 A1 | 9/2012 | Willi et al. |
| 2013/0028768 A1 | 1/2013 | Fontaine et al. |

FOREIGN PATENT DOCUMENTS

| | | |
|---|---|---|
| DE | 1526433 | 5/1970 |
| DE | 19811454 | 9/1999 |
| EP | 2497902 | 9/2012 |
| EP | 2551446 | 1/2013 |
| GB | 1208305 | 10/1970 |
| GB | 1403877 | 8/1975 |
| GB | 1435728 | 5/1976 |
| JP | 4912220 | 2/1974 |
| JP | S57186020 | 11/1982 |
| JP | 59017252 | 4/1984 |
| JP | 6093124 | 5/1985 |
| JP | 628345 | 2/1987 |
| JP | S6241928 | 2/1987 |
| JP | S6241930 | 2/1987 |
| JP | 63179134 | 7/1988 |
| JP | 63179136 | 7/1988 |
| JP | 3-117633 | 5/1991 |
| JP | 3-182632 | 8/1991 |
| JP | 3199627 | 8/1991 |
| JP | 4298641 | 10/1992 |
| JP | 6221176 | 8/1994 |
| JP | 08135460 | 5/1996 |
| JP | 2011-122598 | 6/2011 |
| WO | 2008/043154 | 4/2008 |

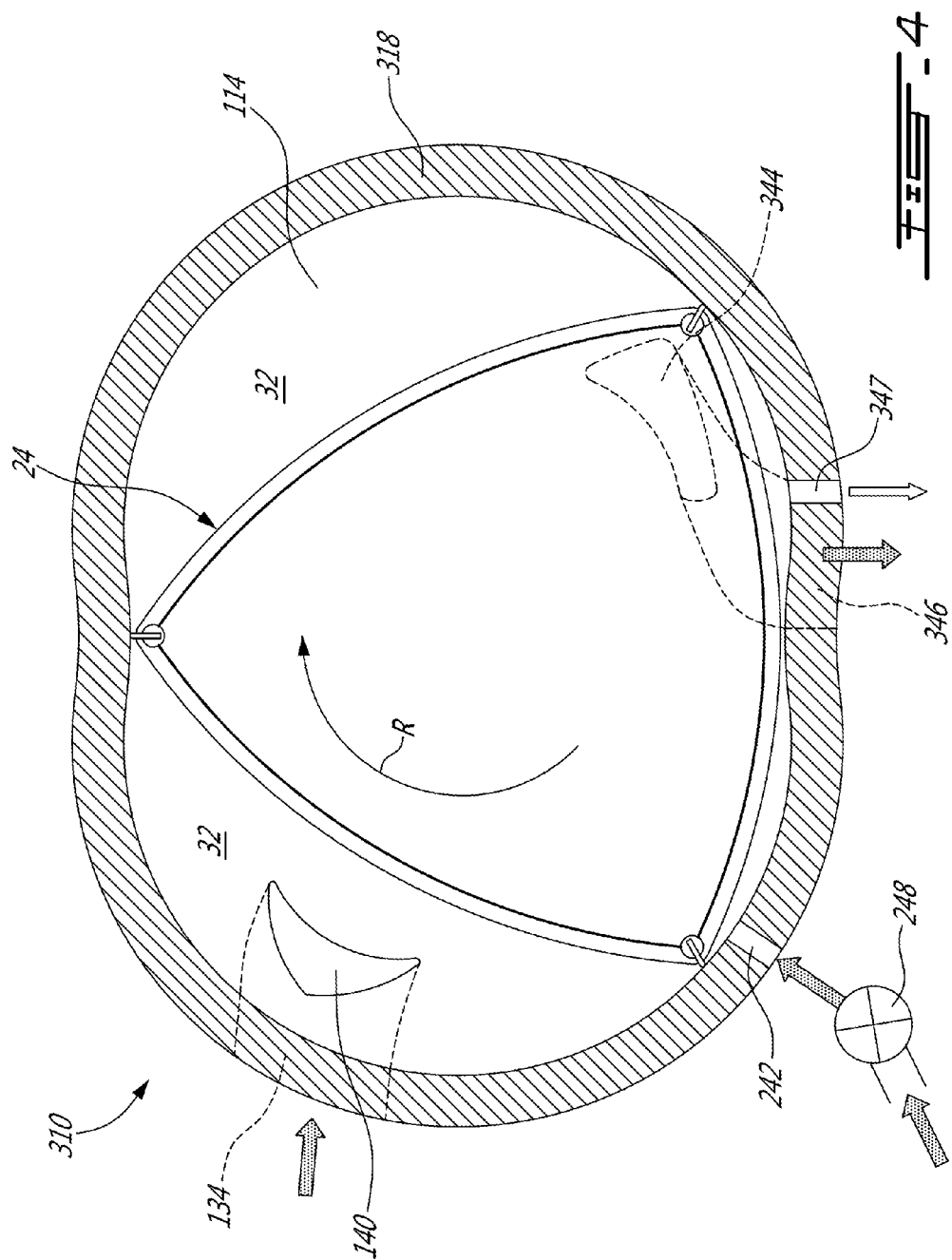

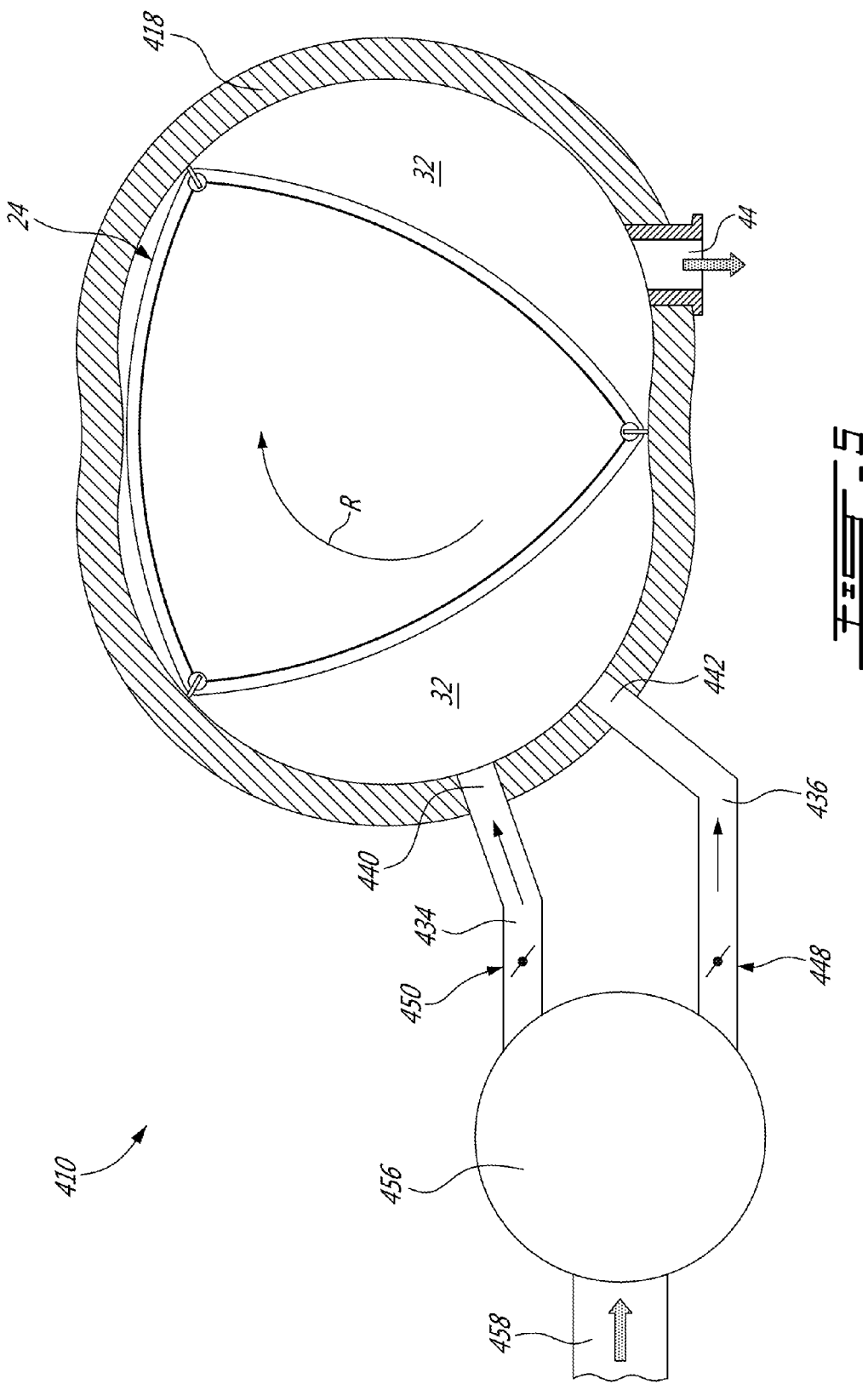

ROTARY INTERNAL COMBUSTION ENGINE WITH VARIABLE VOLUMETRIC COMPRESSION RATIO

CROSS-REFERENCE TO RELATED APPLICATION

This application is a continuation of U.S. patent application Ser. No. 14/152,255 filed Jan. 10, 2014, which is a continuation of U.S. patent application Ser. No. 13/273,488 filed Oct. 14, 2011, which claims priority on provisional U.S. application No. 61/512,563 filed Jul. 28, 2011, the entire contents of all of which are incorporated by reference herein.

TECHNICAL FIELD

The application relates generally to an internal combustion engine using a rotary design to convert pressure into a rotating motion, more particularly, to controlling such an engine.

BACKGROUND OF THE ART

Rotary engines, such as for example Wankel engines, use the eccentric rotation of a piston to convert pressure into a rotating motion, instead of using reciprocating pistons. In these engines, the rotor includes a number of apex or seal portions which remain in contact with a peripheral wall of the rotor cavity of the engine throughout the rotational motion of the rotor to create a plurality of rotating cavities when the rotor rotates.

In Wankel engines, the inlet and exhaust ports are usually designed mechanically to allow a minimum overlap between them during the intake and exhaust portions of the cycle, such as to purge the exhaust cavity of combustion gases prior to re-filling the intake cavity with a fresh supply of air. Failure to purge the exhaust cavity of the combustion gases may result in a reduction in cycle volumetric efficiency. However, overlap of the ports may limit the range of volumetric compression ratio that can be obtained. Therefore, the need remains for improvement in optimizing how rotary engines may be operated.

SUMMARY

In one aspect, there is provided a method of controlling an air intake flow in a rotary engine having a rotor received in an internal cavity of a housing and defining rotating chambers with variable volume, the rotary engine having a primary inlet port, a secondary inlet port, a primary valve, a secondary valve and an exhaust port, the secondary inlet port being in communication with the exhaust port through each of the rotating chambers throughout respective portions of the revolution of the rotor, the method comprising: positioning the secondary inlet port rearwardly of the primary inlet port and forwardly of the exhaust port along a direction of a revolution of the rotor; controlling air intake flows communicating between an air source and the primary and secondary inlet ports, including: during engine start-up, closing the primary valve to prevent the intake air flow between the primary inlet port and the air source and opening the secondary valve to allow the intake air flow between the secondary inlet port and the air source.

In another aspect, there is provided a rotary engine comprising: a rotor body mounted for eccentric revolutions within a stator body to provide rotating chambers of variable volume in an internal cavity of the stator body; the stator body having at least a primary inlet port, a secondary inlet port and an exhaust port defined therein and communicating with the internal cavity, the secondary inlet port being located rearwardly of the primary inlet port and forwardly of the exhaust port along a direction of revolutions of the rotor body, the primary and secondary inlet ports being distinct from one another and spaced apart along the direction of the revolutions; the primary inlet port communicating with an air source; and the secondary inlet port communicating with the air source through a valve; wherein the relative positions of the primary inlet port and the exhaust port define a first volumetric compression ratio of the rotary engine when the valve prevents the communication between the air source and the secondary inlet port; and wherein the relative positions of the secondary inlet port and the exhaust port define a second volumetric compression ratio higher than the first volumetric compression ratio when the valve is opened allowing the communication between the air source and the secondary inlet port.

DESCRIPTION OF THE DRAWINGS

Reference is now made to the accompanying figures in which:

FIG. 4 is a schematic cross-sectional view of a rotary internal combustion engine in accordance with yet another alternate embodiment; and FIG. 5 is a schematic cross-sectional view of a rotary internal combustion engine in accordance with a further alternate embodiment.

DETAILED DESCRIPTION

Figure 1:
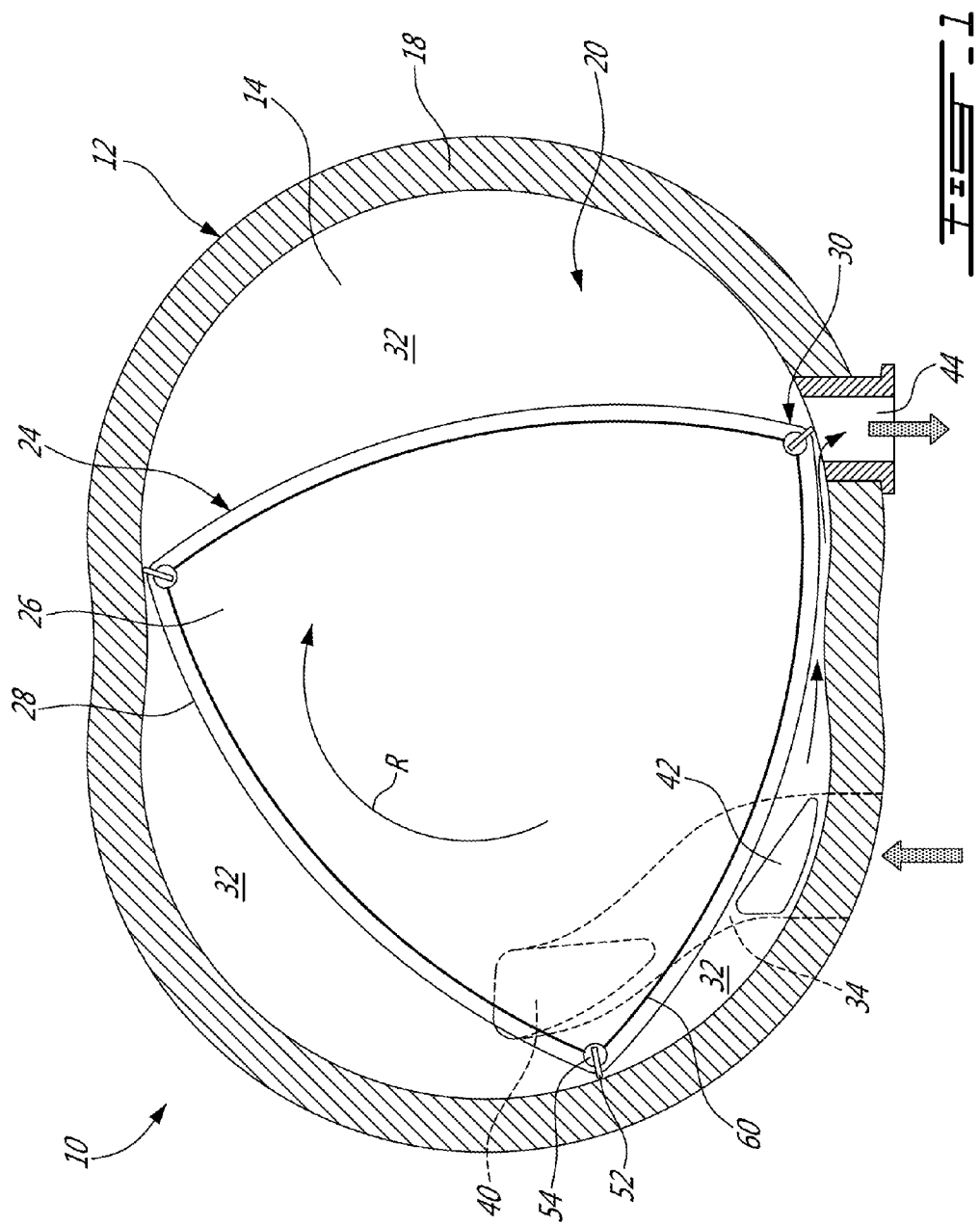
FIG. 1 is a schematic cross-sectional view of a rotary internal combustion engine in accordance with a particular embodiment.

Referring to FIG. 1, a rotary internal combustion engine 10 known as a Wankel engine is schematically shown. In a particular embodiment, the rotary engine 10 is used in a compound cycle engine system such as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein. The compound cycle engine system may be used as a prime mover engine, such as on an aircraft or other vehicle, or in any other suitable application. In any event, in such a system, air is compressed by a compressor before entering the Wankel engine, and the engine drives one or more turbine(s) of the compound engine. In another embodiment, the rotary engine 10 is used without a turbocharger.

The engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides. The apex portions 30 are in sealing engagement with the inner surface of peripheral wall 18 to form three rotating working chambers 32 between the inner rotor 24 and outer body 12. The geometrical axis of the rotor 24 is offset from and parallel to the axis of the outer body 12.

The working chambers 32 are sealed, which may typically improve efficiency. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof.

Although not shown in the Figures, but as well understood, the rotor is journaled on an eccentric portion of a shaft and includes a phasing gear co-axial with the rotor axis, which is meshed with a fixed stator phasing gear secured to the outer body co-axially with the shaft. The shaft rotates the rotor and the meshed gears guide the rotor to perform orbital revolutions within the stator cavity. The shaft performs three rotations for each orbital revolution of the rotor. Oil seals are provided around the phasing gear to prevent leakage flow of lubricating oil radially outwardly thereof between the respective rotor end face 26 and outer body end wall 14.

During one orbital revolution, each chamber varies in volumes and moves around the stator cavity to undergo the four phases of intake, compression, expansion and exhaust, these phases being similar to the strokes in a reciprocating-type internal combustion engine having a four-stroke cycle.

The engine includes a primary inlet port 40 defined through one of the walls of the stator body 12. In the embodiment shown, the primary inlet port 40 is a side port defined in one of the end walls 14. Another opposed primary inlet port may be similarly defined in the other end wall. The primary inlet port 40 is in communication with an air source through an intake duct 34 which is defined as a channel in the end wall 14. The air has a pressure slightly greater than the exhaust pressure of the engine. In a particular embodiment the air source is the air output of the compressor of a compound engine, though any suitable source may be used. The primary inlet port 40 delivers air to each of the chambers 32, and a fuel injection port (not shown) is also provided for delivering fuel into each chamber 32 after the air therein has been compressed. Fuel, such as kerosene (jet fuel) or other suitable fuel, is delivered into the chamber 32 such that the chamber 32 is stratified with a rich fuel-air mixture near the ignition source and a leaner mixture elsewhere, thus providing a so-called stratified charge arrangement, and the fuel-air mixture may be ignited within the housing using any suitable ignition system known in the art. In another embodiment, fuel and air can be mixed outside the engine and delivered as a pre-mixed charge through the primary inlet port 40.

The engine also includes an exhaust port 44 defined through one of the walls of the stator body 12. In the embodiment shown, the exhaust port 44 is a peripheral port defined as an opening through the peripheral wall 18. The rotary engine 10 operates under the principle of the Atkinson or Miller cycle, with its compression ratio lower than its expansion ratio. For example, the ratio obtained by dividing the volumetric compression ratio by the volumetric expansion ratio may be between 0.3 and 0.8. Accordingly, the primary inlet port 40 is located further away (i.e. measured as a function of piston rotation) from the exhaust port 44 when compared to an engine having compression and expansion ratios that are equal or approximately equal to one another. The angle of the primary inlet port 40, relative to the angle of the exhaust port 44, can then be determined to achieve a desired peak cycle pressure given the inlet air pressure. The position of the primary inlet port 40 may vary between the 7 o'clock position up to the 10 o'clock position. In the embodiment shown, the primary inlet port 40 extends between the 8 o'clock and the 9 o'clock positions.

Because of the Miller cycle implementation, the primary inlet port 40 is positioned relative to the exhaust port such that the compression ratio is significantly lower than the expansion ratio. In the embodiment shown, the primary inlet port 40 is spaced from the exhaust port 44 so that the rotor 24 at least substantially prevents communication therebetween in all rotor positions. In other words, each revolution of the rotor 24 can be said to include, for each of the chambers 32, an exhaust portion where the chamber 32 directly communicates with or contains the exhaust port 44, and an intake portion where the chamber 32 directly communicates with or contains the inlet port 40, and the exhaust and intake portions of the revolution for a same chamber do not overlap.

The engine 10 also includes a secondary inlet port or purge port 42 defined through one of the walls of the stator body 12, and communicating with an air source, which may be the same source communicating with the primary inlet port 40. In the embodiment shown, the purge port 42 is a side port defined in one of the end walls 14 and communicates with the air source through the same intake duct 34 as the primary inlet port 40. The purge port 42 is located rearwardly of the primary inlet port 40 and forwardly of the exhaust port 44 relative to the direction R of the rotor revolution and rotation. The purge port 42 is located such as to be in communication with the exhaust port 44 through each of the chambers 32 along a respective portion of each revolution. In other words, each revolution of the rotor 24 can be said to include, for each chamber 32, a purge portion, which is a final stage of the exhaust portion, where the chamber 32 directly communicates with or contains both the purge port 42 and the exhaust port 44. In the embodiment shown, the purge port 42 is also located such as to be in communication with the primary inlet port 40 through each of the chambers 32 along a respective portion of each revolution. Alternately, the purge port 42 may be spaced from the primary inlet port 40 so that the rotor 24 at least substantially prevents communication therebetween in all rotor positions.

The purge port 42 may thus allow for smaller volumetric compression ratios to be achieved while still achieving adequate purging of the exhaust cavity.

Although not shown, the inlet ports 40, 42 may be connected to Helmholtz resonators for which may enhance volumetric efficiency and/or minimize the pumping loss during the intake phase.

In an alternate embodiment, the primary inlet port 40 is also located such as to be in communication with the exhaust port 44 through each of the chambers 32 along a respective portion of each revolution.

In use, through each orbital revolution of the rotor, each chamber 32 is filled with air (pressurized air from a compressor for example) through the primary inlet port 40 during the respective intake portion of the revolution, i.e. the portion of the revolution where the chamber 32 directly communicates with the primary inlet port 40. The air is then further compressed by the reducing volume of the rotating chamber 32. Once the air is further compressed, near minimum volume of the chamber 32, the air is mixed with fuel and the resulting air-fuel mixture is ignited. The combustion gases expand and force the volume of the chamber 32 to increase. As mentioned above, the primary inlet port 40 is positioned relative to the exhaust port 44 such that the volumetric expansion ratio is higher than the volumetric compression ratio. The combustion or exhaust gases exit the chamber 32 through the exhaust port 44 during the exhaust portion of the revolution, i.e. the portion of the revolution where the chamber 32 communicates with the exhaust port 44. The last part of the exhaust portion defines the purge portion of the revolution, where the chamber 32 is in communication with both the purge port 42 and the exhaust port 44, and the air entering the chamber 32 through the purge port 42 is used to purge remaining exhaust gases from the chamber 32.

In a particular embodiment, the communication of the chamber 32 with the exhaust port 44 is closed prior to re-filling the chamber 32 with air through the inlet port 40, i.e. the inlet port 40 does not participate in the purge of the exhaust gases. In an alternate embodiment, the exhaust port 44 is still open when the inlet port 40 starts to open.

Figure 2:
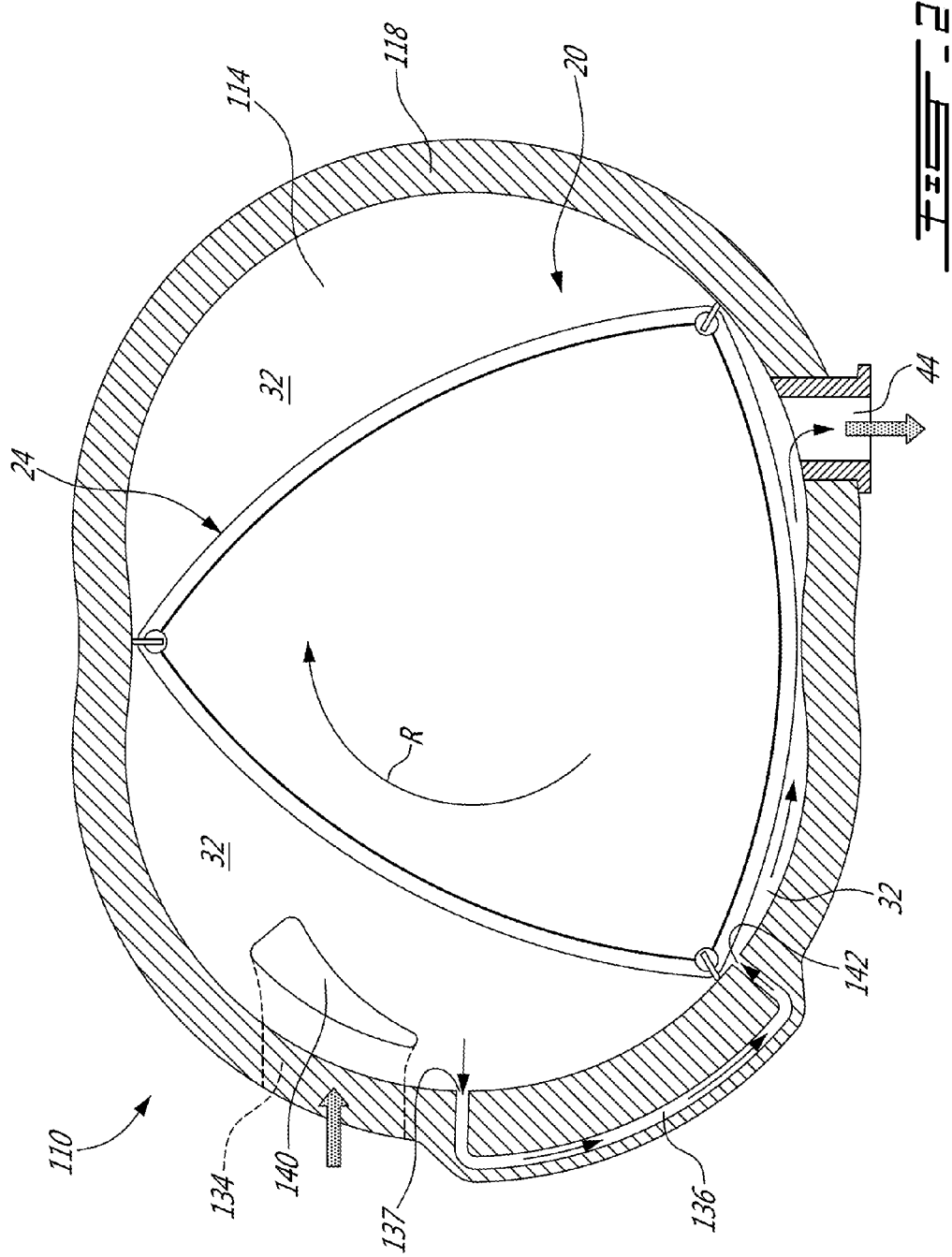
FIG. 2 is a schematic cross-sectional view of a rotary internal combustion engine in accordance with an alternate embodiment.

Referring to FIG. 2, an engine 110 according to another embodiment is shown, with similar elements being indicated by the same reference numerals employed in the description above. In this embodiment, the primary inlet port 140 is defined through the end wall 114 between the 9 o'clock and the 10 o'clock positions, and communicates with the air source by an intake duct 134 which is independent from the purge port 142. The secondary inlet port or purge port 142 is defined by an exit port of a purge line 136 extending through the peripheral wall 118 and having an entry port 137 opening into the cavity 20 adjacent the primary inlet port 140. As such, the air enters the adjacent chamber in communication with the primary inlet port 140, and circulates to the chamber being purged through the purge line 136 and the purge port 142. The purge port 142 is located such as to be in communication with the exhaust port 44 through each of the chambers 32 along a respective portion of each revolution, to purge the exhaust gases from the chamber 32.

The engine 110 also operates under the principle of the Atkinson or Miller cycle, with its compression ratio lower than its expansion ratio. In the embodiment shown, the rotor 24 at least substantially prevents direct communication between the primary inlet port 140 and the exhaust port 44 in any rotor position, with communication being provided through the purge line 136. Alternately, the rotor 24 may allow the primary inlet port 140 and exhaust port 44 to be in momentary direct communication with each other through each chamber 32 sufficiently to purge burnt exhaust gases prior to ingestion of a fresh charge of air for the next combustion cycle.

Figure 3:
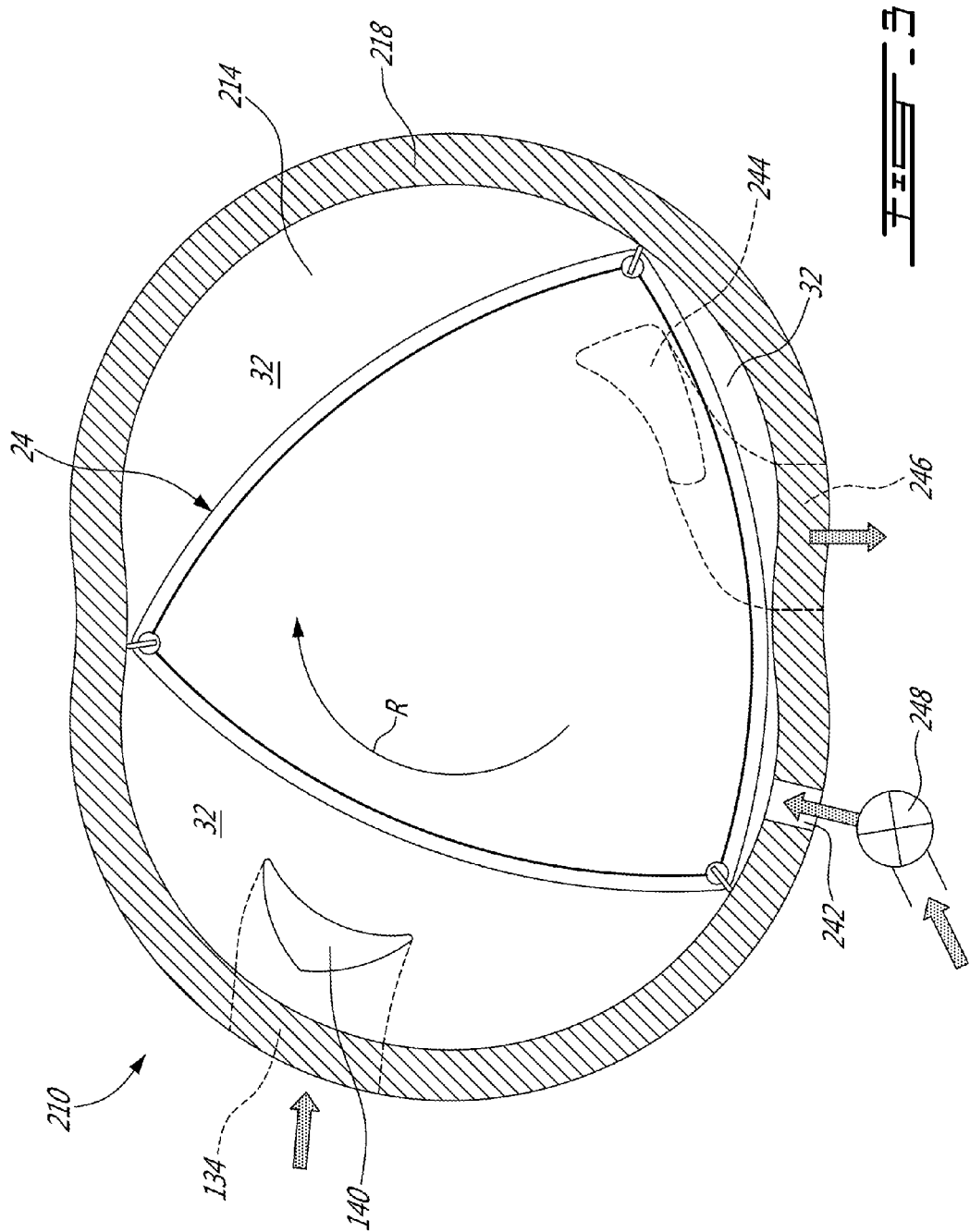
FIG. 3 is a schematic cross-sectional view of a rotary internal combustion engine in accordance with another alternate embodiment.

Referring to FIG. 3, an engine 210 according to another embodiment is shown, again with similar elements being indicated by the same reference numerals. Like in the previous embodiment, the primary inlet port 140 is defined through the end wall 214 and communicates with the air source through an intake duct 134. The exhaust port 244 is a side port, defined in one or both of the end walls 214, and is in communication with the environment of the engine 210 through an exhaust duct 246 which is defined as a channel in the end wall 214.

The purge port 242 is a peripheral port, defined as an opening through the peripheral wall 218. The purge port 242 and exhaust port 244 communicate through each of the chambers 32 along a respective portion of each revolution to purge the exhaust gases. The purge port 242 is connected to the air source, which may be air bled from the adjacent cavity in communication with the primary inlet port 140 or the air source to which the primary inlet port 140 is connected, through a valve 248 (only schematically shown), such as to modulate the purge flow as a function of engine operation conditions, allowing selective recirculation of some of the exhaust gases, for example to optimize the power output, minimize the emission levels, or for another purpose, as will be further detailed below. Although not shown, a similar valve may connect the primary inlet port 140 to the air source.

The engine 210 also operates under the principle of the Atkinson or Miller cycle, with its compression ratio lower than its expansion ratio. In the embodiment shown, the rotor 24 prevents direct communication between the primary inlet port 140 and the exhaust port 244 in any rotor position. Alternately, the rotor 24 may allow the primary inlet port 140 and exhaust port 244 to be in momentary direct communication with each other through each chamber 32.

Referring to FIG. 4, an engine 310 according to yet another embodiment is shown. The engine 310 is similar to the engine 210, with a similar purge port 242 and corresponding valve 248 (and optional valve, not shown, on the inlet port 140), but the position of the exhaust port 344 differs. In this embodiment, the rotor 24 prevents direct communication between the secondary inlet port or purge port 242 and the exhaust port 344 in all rotor positions. A secondary exhaust port 347 is provided in the form of a peripheral port defined as an opening through the peripheral wall 318. The secondary exhaust port 347 is located forwardly of the primary exhaust port 344 and rearwardly of the purge port 242 along the direction of revolution R, in proximity to the primary exhaust port 344. The purge port 242 and secondary exhaust port 347 communicate through each of the chambers 32 along a respective portion of each revolution to purge the exhaust gases, after communication of the chamber 32 with the primary exhaust port 344 has been blocked, to purge the chamber 32.

The engine 310 also operates under the principle of the Atkinson or Miller cycle, with its compression ratio lower than its expansion ratio. In the embodiment shown, the rotor 24 prevents direct communication between the primary inlet port 140 and the exhaust ports 347, 344 in all rotor positions.

Referring to FIG. 5, an engine 410 according to a further embodiment is shown. The engine 410 has a primary inlet port 440 located between the 8 o'clock and 9 o'clock positions, and a secondary inlet port or purge port 442, with both inlet ports 440, 442 being defined in the form of peripheral ports as openings through the peripheral wall 418. The primary inlet port 440 and secondary inlet port 442 are each connected to a same connecting duct 456, which can be for example a plenum, a Y-piece, etc., through a respective conduit 434, 436. Each conduit includes a valve 448, 450 therein that can selectively open or close it. The connecting duct 456 communicates with the air source, for example the exhaust of a compressor in the case of a compound cycle engine system, through an intake duct 458. The exhaust port 44 is a peripheral port similar to that of the embodiments of FIGS. 1-2.

In the embodiment shown, the rotor 24 prevents direct communication between the primary inlet port 440 and the exhaust port 44 in any rotor position. Alternately, the rotor 24 may allow the primary inlet port 440 and exhaust port 44 to be in momentary direct communication with each other through each chamber 32.

The valves 448, 450 which can be for example pneumatic, electric or hydraulic valves, are controlled, either passively or electronically, to modulate the flow between the primary and secondary inlet ports 440, 442, to vary the pressure ratios of the engine to optimize the engine operation at off-design conditions. Such modulation may allow for a suitable trade-off between mission fuel burn, engine power and exhaust gas atmospheric emissions or other factors.

In a particular embodiment, the valves 448, 450 are controlled as follows during three different stages of operation of the engine.

In use, in one example such as during a first operational stage, which corresponds to engine start-up, the primary valve 450 is closed or substantially closed, and the secondary valve 448 is open, so that only (or primarily) the secondary inlet port 442 delivers air to the chambers 32. Doing so may allow for a relatively higher volumetric compression ratio than would otherwise be available, which increases the air temperature and facilitates combustion, which it turn may facilitate start-up, and perhaps especially during cold starts. The secondary inlet port 442 may be positioned such that the engine in this configuration has a volumetric compression ratio which is near, e.g. equal or substantially equal, to the volumetric expansion ratio of the engine.

In another example, during a second operational stage of the engine, which corresponds to engine idle or low power operation, the secondary valve 448 is closed or substantially closed, either abruptly or progressively, and the primary valve 450 is open. With the secondary valve 448 closed, purging of the exhaust gases is significantly reduced/impeded (if the primary inlet port 440 and exhaust port 44 communicate) or prevented (if the rotor 24 prevents communication between the primary inlet port 440 and exhaust port 44), which reduces exhaust and thus may help minimize the emission levels of the engine when in this condition. The primary inlet port 440 is positioned such that the engine in this configuration operates under the principle of the Atkinson or Miller cycle, with its compression ratio lower than its expansion ratio.

In another example, during a third operational stage of the engine, which corresponds to high power operation of the engine, both valves 448, 450 are open, so that the secondary inlet port 442 acts as a purge port as discussed above. The secondary valve 448 may be opened, partially or completely, as the power demand increases. The relatively lower volumetric compression ratio of the Atkinson or Miller cycle (as compared to standard cycles) combined with the purging of the exhaust gases from the cavities help maximize power output. In a particular embodiment, the third operational stage may start at approximately 50-80% of maximum power of the engine. However this point can be varied by an electronic control (not shown) sending a signal to the valve actuator to vary the opening of the valve such that the desired outputs (power, emissions, fuel consumption and exhaust gas temperature) are optimized for different operating conditions such as ambient temperature, altitude, throttle levels and rotor speeds.

Similar valves and controls may be provided with other embodiments, for example the embodiments shown in FIGS. 3-4. Air to the inlet ports may be controlled in other engine operational stages, or scenarios, to provide specific benefits or operational effects, as desired.

The above description is meant to be exemplary only, and one skilled in the art will recognize that changes may be made to the embodiments described without departing from the scope of the invention(s) disclosed. For example, elements of different embodiments such as locations, configurations and shapes of the various ports may be combined differently than shown. The examples apply to both peripheral and side inlet/exhaust ports, or any suitable combination thereof. Any suitable fuel & ignition systems may be employed. The term "valve" is intended to encompass any suitable airflow regulation apparatus which may be used to achieve the airflow control effects described; any suitable valving arrangement may be employed. Any suitable number of inlet ports may be employed. The present teachings may be applied to any suitable rotary engine, such as a rotary vane pumping machine or other suitable engine, and is thus not limited in application to Wankel engines. Other modifications which fall within the scope of the present invention will be apparent to those skilled in the art, in light of a review of this disclosure, and such modifications are intended to fall within the appended claims.

The invention claimed is:

1. A method of controlling an air intake flow in a rotary engine having a rotor received in an internal cavity of a housing and defining rotating chambers with variable volume, the rotary engine having a primary inlet port, a secondary inlet port, a primary valve, a secondary valve and an exhaust port, the secondary inlet port being in communication with the exhaust port through each of the rotating chambers throughout respective portions of a revolution of the rotor, the method comprising:
    positioning the secondary inlet port rearwardly of the primary inlet port and forwardly of the exhaust port along a direction of the revolution of the rotor;
    controlling air intake flows communicating between an air source and the primary and secondary inlet ports, including:
    during engine start-up, closing the primary valve to prevent the intake air flow between the primary inlet port and the air source and opening the secondary valve to allow the intake air flow between the secondary inlet port and the air source.

2. The method as defined in claim 1, the method further comprising:
    allowing the air intake flow between the primary inlet port and the air source by opening the primary valve while modulating the intake air flow between the secondary inlet port and the air source by varying an opening degree of the secondary valve after engine start-up.

3. The method as defined in claim 2, wherein modulating the intake air flow between the secondary inlet port and the air source after engine start-up includes modulating the secondary valve between a completely closed position and a completely open position.

4. The method as defined in claim 1, further comprising:
    preventing air flow communication between the primary inlet port and the exhaust port throughout each revolution of the rotor.

5. The method as defined in claim 1, wherein closing the primary valve to prevent the intake air flow between the primary inlet port and the air source and opening the secondary valve to allow the flow between the secondary inlet port and the air source includes obtaining a volumetric compression ratio at least equal to a volumetric expansion ratio of the rotary engine.

6. The method as defined in claim 2, wherein allowing the intake air flow between the primary inlet port and the air source includes obtaining a volumetric compression ratio lower than a volumetric expansion ratio of the rotary engine.

7. The method as defined in claim 1, further comprising, after engine start-up, modulating the intake air flow between the primary inlet port and the air source by varying an opening of the primary valve.

8. The method as defined in claim 1, wherein the intake air flow between the secondary inlet port and the air source is modulated separately from a fuel flow to the rotating chambers.

9. A rotary engine comprising:
a rotor body mounted for eccentric revolutions within a stator body to provide rotating chambers of variable volume in an internal cavity of the stator body;
the stator body having at least a primary inlet port, a secondary inlet port and an exhaust port defined therein and communicating with the internal cavity, the secondary inlet port being located rearwardly of the primary inlet port and forwardly of the exhaust port along a direction of revolutions of the rotor body, the primary and secondary inlet ports being distinct from one another and spaced apart along the direction of the revolutions;
the primary inlet port communicating with an air source; and
the secondary inlet port communicating with the air source through a valve;
wherein the relative positions of the primary inlet port and the exhaust port define a first volumetric compression ratio of the rotary engine when the valve prevents the communication between the air source and the secondary inlet port; and
wherein the relative positions of the secondary inlet port and the exhaust port define a second volumetric compression ratio higher than the first volumetric compression ratio when the valve is opened allowing the communication between the air source and the secondary inlet port.

10. The engine as defined in claim 9, wherein the valve is a secondary valve, the primary inlet port communicating with the air source through a primary valve.

11. The engine as defined in claim 10, wherein the primary and secondary valves are operable independently of one another.

12. The engine as defined in claim 9, wherein a position of the secondary inlet port relative to the exhaust port defines the second volumetric compression ratio as at least equal to a volumetric expansion ratio of the rotary engine.

13. The engine as defined in claim 9, wherein the secondary inlet port is located relative to the exhaust port so as to be in momentary communication with the exhaust port through each of the rotating chambers along a respective portion of each revolution of the rotor body.

14. The engine as defined in claim 9, wherein the rotor is configured and the primary inlet port and the exhaust port are located to prevent communication between the primary inlet port and the exhaust port through the rotating chambers in any rotor position.

15. The engine as defined in claim 9, wherein the valve is selected from the group consisting of pneumatic valves, hydraulic valves and electric valves.

16. The engine as defined in claim 9, wherein the engine is a Wankel engine, with the stator body having walls defining the internal cavity having an epitrochoid shape with two lobes, and the rotor body having three circumferentially spaced apex portions, the rotor body being engaged to an eccentric portion of a shaft to perform orbital revolutions within the internal cavity with each of the apex portions remaining in sealing engagement with a peripheral one of the stator walls and separating three rotating chambers defined in the internal cavity around the rotor body.

17. The engine as defined in claim 9, wherein the communication of the secondary inlet port with the air source through the valve is separate from of a fuel flow to the rotating chambers.

* * * * *